(12) United States Patent
Tian

(10) Patent No.: US 11,496,425 B1
(45) Date of Patent: Nov. 8, 2022

(54) MODIFYING MESSAGE CONTENT BASED ON USER PREFERENCES

(71) Applicant: WhatsApp LLC, Menlo Park, CA (US)

(72) Inventor: Cheng Tian, San Ramon, CA (US)

(73) Assignee: WhatsApp LLC, Menlo Park, CA (US)

( * ) Notice: Subject to any disclaimer, the term of this patent is extended or adjusted under 35 U.S.C. 154(b) by 70 days.

(21) Appl. No.: 15/976,489

(22) Filed: May 10, 2018

(51) Int. Cl.
*H04L 51/063* (2022.01)
*G06N 20/00* (2019.01)

(52) U.S. Cl.
CPC .......... *H04L 51/063* (2013.01); *G06N 20/00* (2019.01)

(58) Field of Classification Search
CPC .......... H04L 9/065; H04M 2215/8137; H04M 2215/7492; H04M 15/844; H04W 4/14; G06F 3/04817
See application file for complete search history.

(56) References Cited

U.S. PATENT DOCUMENTS

| | | | | |
|---|---|---|---|---|
| 2002/0010794 A1* | 1/2002 | Stanbach, Jr. | .......... | G06Q 30/02 709/245 |
| 2009/0210270 A1* | 8/2009 | Quan | .......... | G06Q 30/02 705/14.67 |
| 2010/0199171 A1* | 8/2010 | Grosso | .......... | G06Q 10/107 715/234 |
| 2011/0167458 A1* | 7/2011 | Shenfield | .......... | G06Q 20/123 725/62 |
| 2013/0159919 A1* | 6/2013 | Leydon | .......... | G06F 3/04812 715/780 |
| 2018/0074661 A1* | 3/2018 | Zhao | .......... | G10L 15/18 |
| 2018/0136794 A1* | 5/2018 | Cassidy | .......... | G06F 3/04817 |
| 2020/0380199 A1* | 12/2020 | Judovsky | .......... | H04L 51/18 |

* cited by examiner

*Primary Examiner* — Glenford J Madamba
(74) *Attorney, Agent, or Firm* — Fenwick & West LLP

(57) ABSTRACT

A messaging system receives a message including a recipient ID and a message body, the message body containing one or more customizable fields. The messaging system receives a user preference model based on the recipient ID. The user preference model identifies message elements and content preferred by the recipient of the message. Based on the user preference model, the messaging system modifies the customizable fields in the message body, generating a modified message. The modified message is transmitted to a client device associated with the recipient ID for presentation to the recipient.

20 Claims, 5 Drawing Sheets

MODIFYING MESSAGE CONTENT BASED ON USER PREFERENCES

BACKGROUND

This disclosure relates generally to electronic messaging, and more particularly to presenting information in messages exchanged using electronic messaging systems.

Using dedicated messaging applications is a common method of online communication. Users use client devices, such as smartphones, to execute the messaging applications in order to exchange messages with other users. Messaging applications allow users to send and receive text, images, videos, and other forms of content.

Use of dedicated messaging applications for commercial transactions, business contact points, and other interactions with third party entities such as businesses and organizations is becoming more commonplace. For example, a customer of a third party business might use such a messaging application to send an inquiry about a product to the third party. Third parties, in addition, may wish to use such applications to communicate directly with customers and potential customers about promotions, products, and other news. One feature provided by some dedicated messaging applications is the ability to send messages to a large number of users at once.

A problem arises when messages sent from third parties to users are generic or do not appeal to individual users. The message may include vocabulary terms, phrases, emojis, or other content elements that are not relevant to a user due to the interests or preferences of the user. As a result, users that receive the message may be unlikely to engage with the third party, and the impact and utility of the message is less than optimal.

SUMMARY

The above and other issues are addressed by a messaging system that modifies the content of messages sent to users based on user preferences. The messaging system uses user preference models to identify message elements preferred by particular users of the messaging system to generate modified message that are customized to the preferences of the recipients. The messaging system receives a message including a message body having one or more customizable fields and a recipient ID. Based on the associated recipient ID, the messaging system receives a user preference model for the recipient, the user preference model identifying message elements preferred by the recipient. For example, the user preference model may include information about vocabulary, phrases, emojis, and other content preferred by the recipient. Based on the user preference model, the messaging system modifies the customizable fields in the message body, producing a modified message. The modified message is transmitted to the client device associated with the recipient ID for presentation to the recipient.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
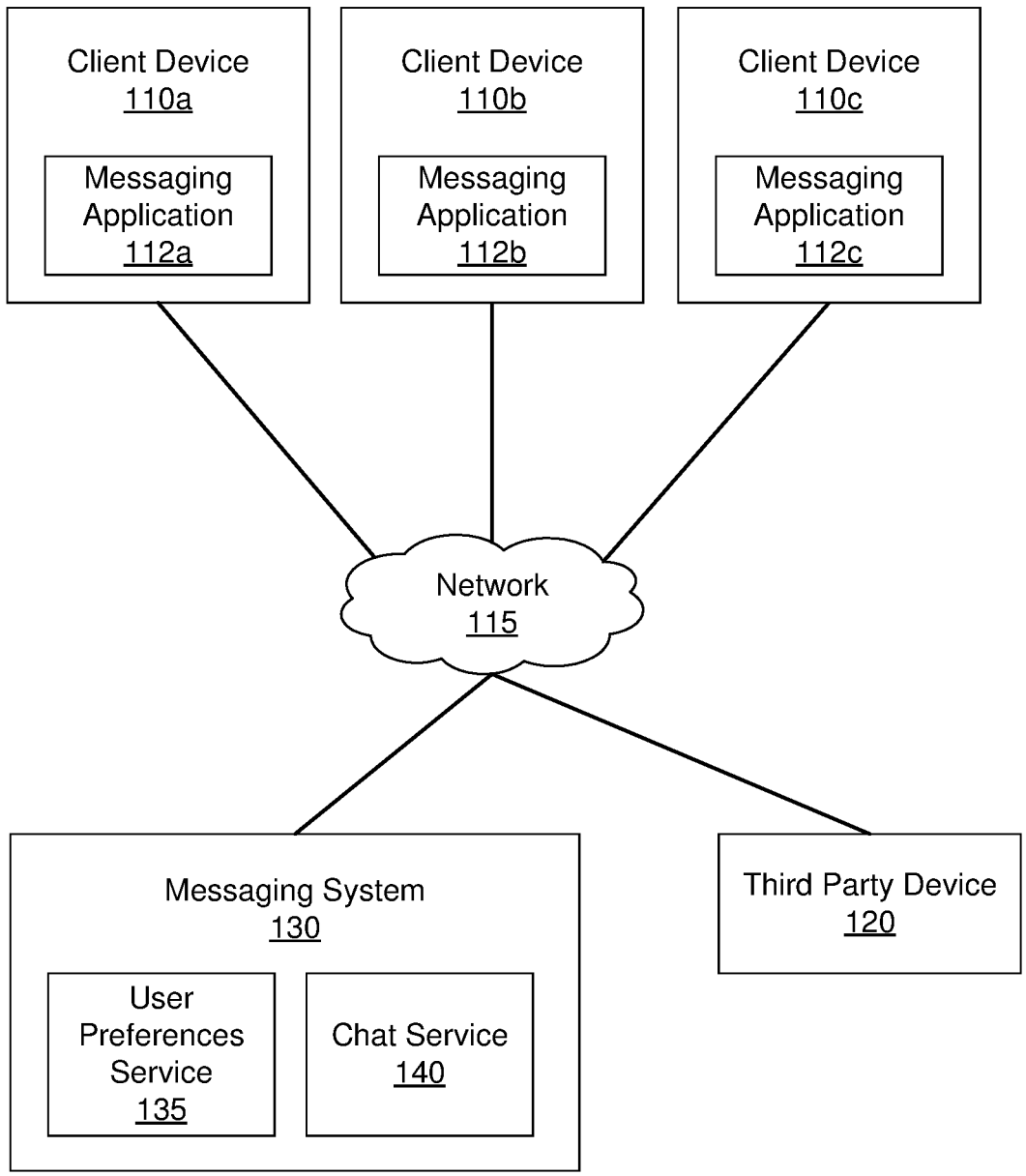
FIG. 1 is a block diagram of an environment including an electronic messaging system, in accordance with an embodiment.

FIG. 1 is a block diagram of an environment 100 including an electronic messaging system 130, according to one embodiment. The system environment 100 shown by FIG. 1 comprises one or more client devices 110 connected to the messaging system 130 via a network 115. Each client device 110 contains a messaging application 112. The messaging system 130 contains a chat service 140 and a user preferences service 135. One or more third party servers 150 are also connected to the network 115. While only a few client devices 110 are shown in FIG. 1, embodiments of the environment 100 can have many such entities connected to the network 115. In alternative configurations, different and/or additional components may be included in the system environment 100.

FIG. 1 uses like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a," "110b," and/or "110c" in the figures.

A client device 110 is a computing device that can transmit and/or receive data via the network 115. A user may use the client device 110 to perform functions such as exchanging messages using the messaging system 130, browsing websites on web servers on the network 115, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 130.

The client device 110 may execute one or more applications ("apps") that extend the functionality of the client device. The apps may include a web browser that allows the client device 110 to interact with websites provided by servers connected to the network 115. The apps may also include one or more dedicated apps for accessing the messaging system 130. In one embodiment, the user downloads and installs apps on the client device 110 for specific purposes, such as exchanging messages using the messaging system 130. Alternatively, the functionality of an app may be incorporated into an operating system of the client device 110 or included in other native functionality of the client device.

The messaging application 112 illustrated within the client device 110 in FIG. 1 represents an application for interacting with the messaging system 130 via the network 115. The messaging application 112 enables a user of the client device 110 to exchange messages with other client devices and third party devices. Messages exchanged using the messaging application 112 may include message elements such as emojis, text, images, videos, URLs, and/or other forms of content.

One or more third party devices 120 are coupled to the network 115. The third party devices 120 are also remote from the client devices 110 and may be implemented using one or more dedicated computers and/or a cloud computing platform. The third party devices 120 can send and receive messages using the messaging system 130. In one embodiment, messages sent by third party devices 120 have templates including one or more recipient identifiers (IDs) and a message body. The message body may include customizable fields that are modified by the chat service 140 based on preferences of the users associated with the one or more recipient IDs.

The messaging system 130 interacts with the messaging applications 112 of the client devices 110 to support the exchange of electronic messages among the devices. The messaging system 130 is remote from the client devices 110 and may be implemented using one or more dedicated computers and/or a cloud computing platform. In one embodiment, the messaging system 130 contains a user preferences service 135 and a chat service 140.

The user preferences service 135 generates, maintains, and accesses a store of user preference models. The user preferences service 135 may be implemented on the server of the messaging system 130 or may be implemented on a remote server.

A user preference model identifies message elements that are frequently used or well received by a user of the messaging system 130. A user preference model is associated with the recipient identifier of the user. For example, the user preference model may identify how the user messages other users of the messaging system 130 or how friends of the user message the user. The user preference model may include data on the use of emojis, videos, words, sets of words, or other elements of a message. In the case of emojis, the user preference model may identify the frequency of emojis used, specific emojis used, or types of emojis used. The emojis may additionally be categorized (e.g., by emotion expressed; by smiling, frowning, etc.). Similarly, the user preference model may identify words, phrases, and acronyms frequently used in messages sent or received by the user. The user preference model can additionally identify preferred vendors in different categories of services. For example, the user preference model may identify a user preference for an online or mobile payment system, a social networking platform, or another type of service.

The user preferences service 135 uses a machine-learned model to develop the user preference models. The machine-learned model is trained using data from the messaging system 130 to identify message elements and other factors that indicate a user's preferences.

The chat service 140 receives and transmits messages between users of the messaging system 130. When users of client devices 110 or third party servers 150 send messages on the messaging system 130, the chat service 140 receives the message and one or more recipient identifiers associated with the message. In one embodiment shown in FIG. 1, the chat service 140 performs any modification or formatting specified by the message according to the user preference model associated with the recipient ID.

By performing modifications to messages based on the user preference models associated with recipient IDs, the messaging system 130 ensures that users receive messages customized to their preferences while maintaining user privacy. That is, messages received by the users are customized to reflect message elements identified as preferred by the user based on the user preference models, and are less likely to feel irrelevant or like spam to recipients. Additionally, because the modifications are performed by the messaging system 130, the third party 120 cannot access the user preference model or the final customized message. Accordingly, the messaging system 130 produces modified messages that are more likely to be positively received and interacted with by recipients, without requiring that users of the messaging system reveal preference data to third party senders.

In one embodiment, messages exchanged via the messaging system 130 are encrypted such that the messaging system cannot access the content of messages. In this embodiment, the user preferences service 130 is located in the messaging application 112 of the client devices 110. The messaging application 112 on the client device 110 of the receiving user uses a locally generated and stored user preference model to modify the content of messages. The messaging system 130 and the third party 120 cannot access the user preference model or the final customized message.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
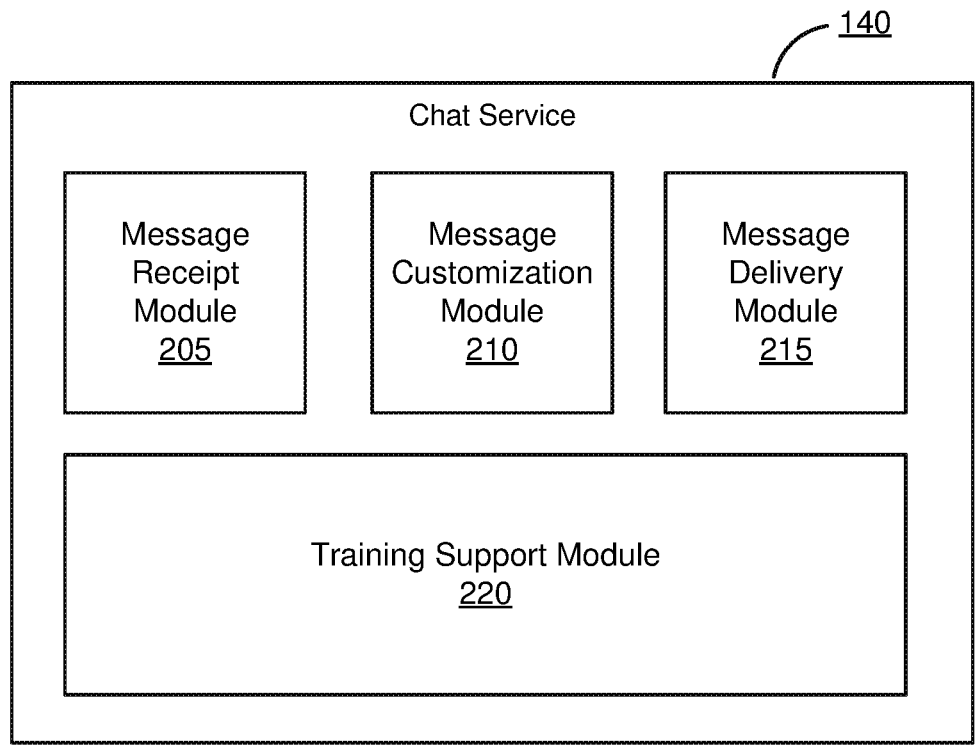
FIG. 2 is a block diagram of an architecture of a chat service, in accordance with an embodiment.

FIG. 2 is a block diagram of an architecture of the chat service 140 according to one embodiment. The chat service 140 shown in FIG. 2 includes a message receipt module 205, a message customization module 210, a message delivery module 215, and a training support module 220. In other embodiments, the chat service 120 may include additional, fewer, or different modules. In addition, the functionality attributed to specific modules herein may be performed by other modules in other embodiments.

The message receipt module 205 receives messages sent using the messaging system 130. In one embodiment, the message is sent from a client device 110 or a third party device 120. The message may include or be associated with one or more recipient IDs identifying recipients of the message. In one embodiment, the message additionally includes or is associated with a flag indicating that the message body includes one or more customizable fields. Upon identifying the flag, the message receipt module 205 transmits the one or more recipient IDs for the message to the user preferences service 135.

The message customization module 210 receives user preference models from the user preferences service 135 and modifies messages received by the message receipt module 205 based on the user preference models for messages having the flag. For messages in which the flag is set, the message customization module 210 identifies customizable fields in the message. The customizable fields include metadata describing types of content that should be used to fill the fields. The message customization module 210 uses the metadata and user preference models to determine appropriate elements of the selected types and fills the customizable fields with the elements. In one embodiment, the metadata for a field describes a set of alternative elements from which one element may be selected. The range of elements may include elements of various types (e.g., a customizable field may be filled with either text or with an emoji representative of the text), or with variations on an element type (e.g., a customizable field may be filled with one of several emojis conveying a message).

$$\text{custom element options=[``happy'',``:)'',happy\_emoji\_1,happy\_emoji\_2]} \qquad \text{Equation 1}$$

As one example shown in Equation 1, a customizable field intended to be filled with an element may have metadata indicating a replaceable range of elements from which the message customization module 210 selects based on the user preference model of the identified recipient. As in Equation 1, the metadata indicates a range of alternative element options including text strings ("happy" and ":)") and emojis representative of the message ("happy_emoji_1" and "happy_emoji_2"). The two emojis both express the meaning "happy," but in different ways. For example, the emojis may illustrate the same facial expression with different skin tones. In other examples, the range of element options may include fewer or additional elements, as well as different types of elements. For example, a customizable field may indicate that a payment request be generated from one or more possible third party payment services. The particular payment service can be customized accordingly based on the preference of the identified recipient.

The message delivery module 215 receives modified messages from the message customization module 210 and transmits the modified messages to client devices 110 associated with the recipient IDs of the modified messages. The modified message is transmitted in association with the identifier of the sender, such that the modified message and the sender identity can be displayed by the client device 110 of the identified recipient.

The training support module 225 collects a subset of messages exchanged using the messaging system 130 and transmits the collected messages as training data to the user preferences service 135. Because user preference models are generated based on historic messaging data associated with a user of the messaging system 130, the training support module 225 provides the user preferences service 135 with training data to ensure that the user preference models accurately reflect the user's preferences and messaging style. The training support module 225 sends messages sent by the user as well as messages received by the user via the messaging system 130. In one embodiment, the training support module 225 additionally collects and transmits usage data associated with the user's response to received messages. For example, the training support module 225 may identify how quickly a user responds to received messages, time of day of the messages, and other factors. In one embodiment, the training support module 225 anonymizes user identifiers associated with messages. For example, the user identifiers are replaced with randomly generated identifiers or strings.

Figure 3:
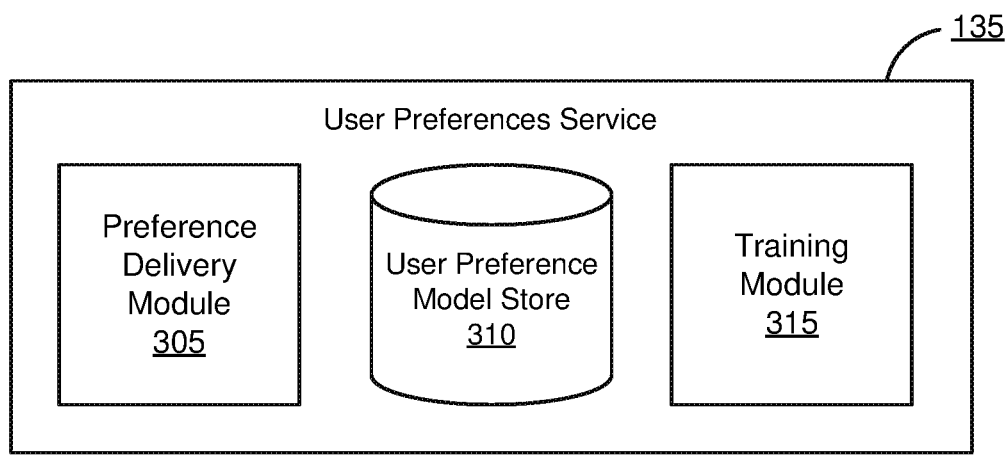
FIG. 3 is a block diagram of an architecture of a user preferences service, in accordance with an embodiment.

FIG. 3 is a block diagram of an architecture of the user preferences service 135 according to one embodiment. The user preferences service 135 shown in FIG. 3 includes a preference delivery module 305, a user preference model store 310, and a training module 315. In other embodiments, the user preferences service 135 may include additional, fewer, or different modules. In addition, the functionality attributed to specific modules herein may be performed by other modules in other embodiments.

The preference delivery module 305 receives recipient IDs from the chat service 140 and retrieves from the user preference model store 310 a user preference model associated with the received recipient IDs. The preference delivery module 305 then transmits the retrieved user preference model to the chat service 140.

The user preference model store 310 stores and maintains user preference models. The user preference models are stored in association with user identifiers, the user identifiers indicating users of the messaging system 130 for which particular user preference models are generated.

The training module 315 builds user preference models based on training data received from the chat service 140. The user preference models are generated based on historic data collected on messaging preferences exhibited by users on the messaging system 130 in the training data and, as described above, identify message elements including emojis, words, and/or phrases that a user prefers in messaging.

An embodiment of the training module 315 applies machine learning techniques to build the user preference models. The training module 315 forms a training set for a given user from the training data. The training set includes messages sent and received by the user using the messaging system 130. In one embodiment, the training set may include usage metadata about the messages, such as timestamps, relationships of the user to the other user or users associated with the messages, and other factors indicating user preferences for the messages or the elements of the messages.

The training module 315 extracts feature values from the training set of messages, the features being variables deemed potentially relevant to message elements preferred by the user with respect to one or more types of content. Specifically, the feature values extracted by the training module 315 include emojis, words, phrases, and other elements used often in the messages, the frequency of any emojis being used, actions taken by the user to indicate a preference or lack of preference (e.g., a quick response time; a frequently messaged friend; a "like" action associated with a message). Other features may also be associated with other information about the user, such as the frequency of the user accessing the messaging application 112. An ordered list of the features for a content item is herein referred to as the feature vector for the training set of messages. In one embodiment, the training module 315 applies dimensionality reduction (e.g., via linear discriminant analysis (LDA), principle component analysis (PCA), or the like) to reduce the amount of data in the feature vectors for the training set of messages to a smaller, more representative set of data.

The training module 315 uses supervised machine learning to build the user preference models, with the feature vectors of the positive training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine-learned model, when applied to the feature vector extracted from the training set of messages, outputs a user preference model for the user associated with the training set of messages.

Once trained, the training module 315 builds user preference models for users of the messaging system 130. In one embodiment, a user preference model is generated for each user of the messaging system 130. In another embodiment, a user preference model is generated for a user upon receiving a request from the chat service 140 for a user preference model of the particular user. In one embodiment, the training module 315 periodically updates user preference models for users. For example, a user preference model is updated after a set amount of time has passed since the last update. In another example, a user preference model is updated after a threshold amount of additional training data is received for the user. In another example, a user preference model is updated for each request received by the user preferences service 135 for the user preference model of the user.

Figure 4:
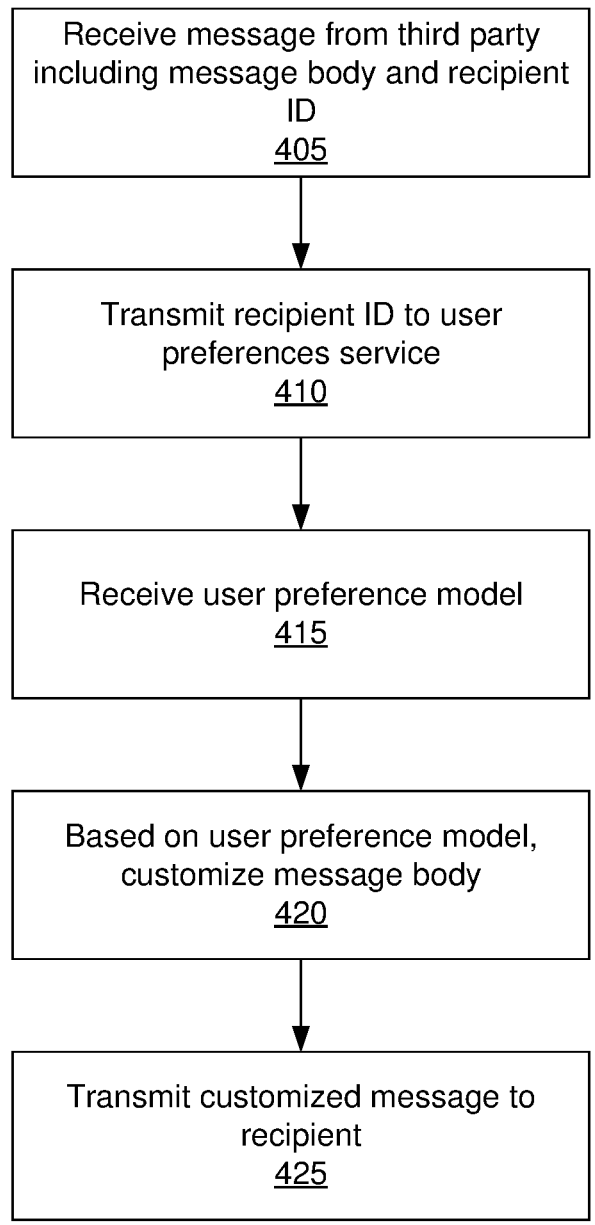
FIG. 4 is a flow chart illustrating a method of modifying message content based on user preferences, in accordance with an embodiment.

FIG. 4 is a flow chart illustrating a method of modifying message content based on user preferences according to one embodiment. The steps of FIG. 4 may be performed by the messaging system 130. Some or all of the steps may be performed by other entities in other embodiments. In addition, other embodiments may include different and/or additional steps, and the steps may be performed in different orders.

The messaging system 130 receives 405 a message from a third party, the message including a message body and a recipient ID. In one embodiment, a message may be associated with more than one recipient ID. The messaging system 130 transmits 410 the recipient ID to the user preferences service 135 and receives 415 a user preference model associated with the recipient ID. Based on the user preference model, the messaging system 130 customizes 420 the message body. The messaging system 130 then transmits 425 the customized message to the user identified by the recipient ID.

Figure 5:
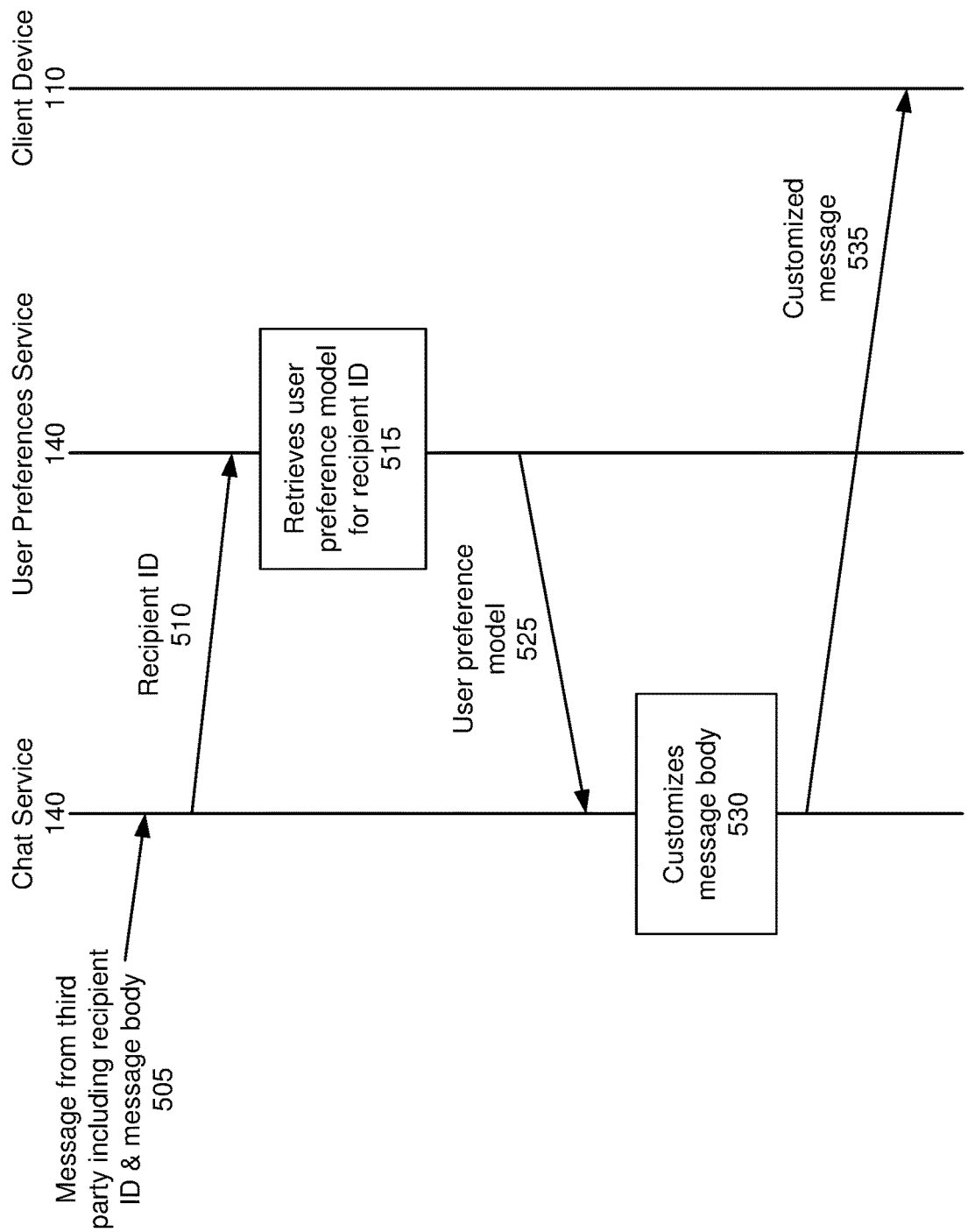
FIG. 5 is a transaction diagram illustrating interaction between a chat service, a user preferences service, and a client device, in accordance with an embodiment.

FIG. 5 is a transaction diagram illustrating interactions between a chat service 140, a user preference service 140, and a client device 110, in accordance with an embodiment. The chat service 140 receives 505 a message from a third party including a recipient ID and a message body. The third party may be a user of the messaging system 130, a business, or another third party. The chat service 140 transmits 510 the recipient ID to a user preferences service 135. The user preferences service 135 retrieves 515 the user preference model associated with the recipient ID and transmits 525 the user preference model to the chat service 140. Based on the received user preference model, the chat service 140 customizes 530 the message body of the received message and transmits 535 the customized message to the client device 110 associated with the recipient ID for presentation to the user.

Figure 6:
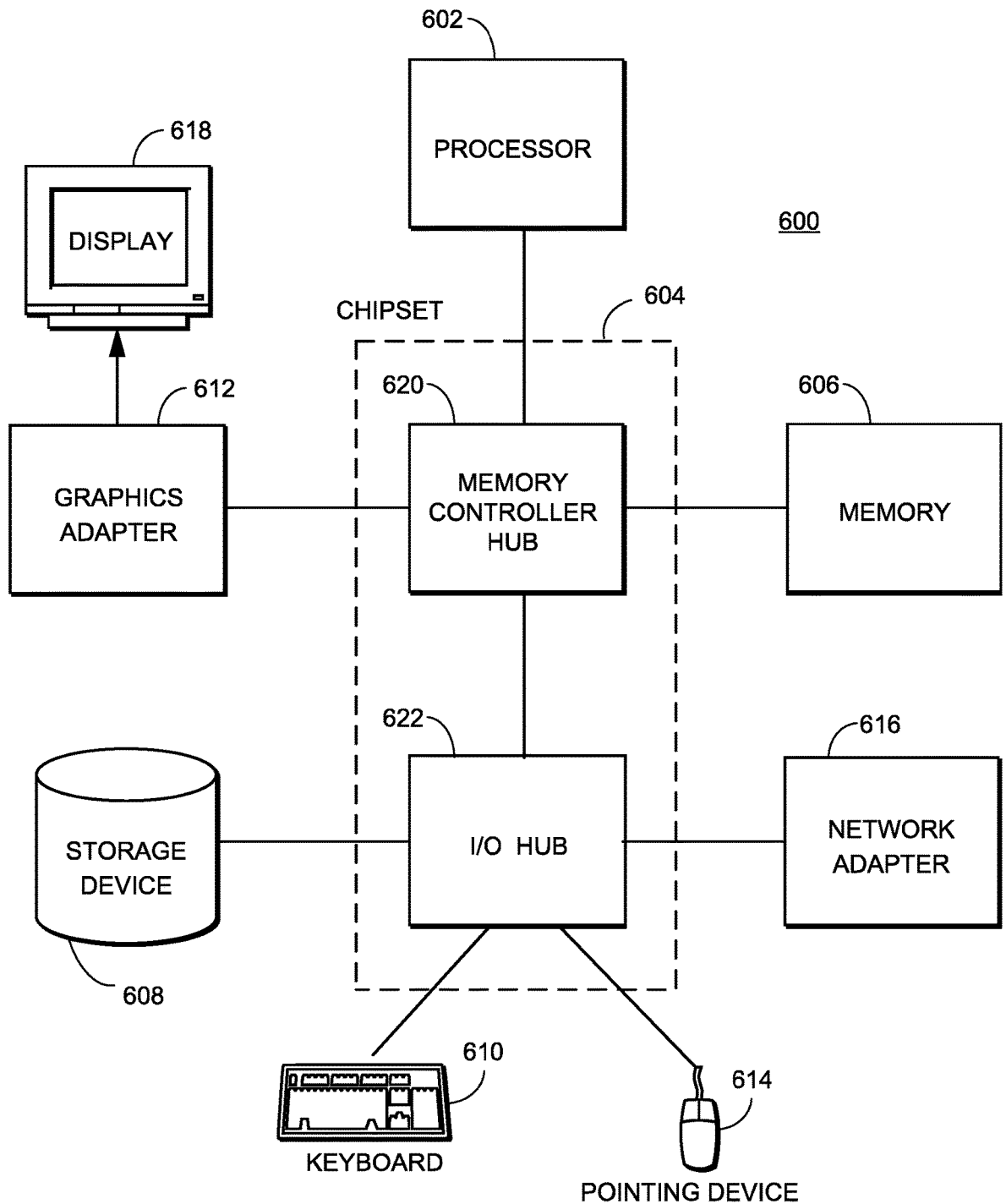
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as a server operating the messaging system 130. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at a messaging system, a message from a third party to a user of the messaging system who is a recipient of the message, the received message including a recipient identifier (ID) identifying the recipient of the message and a message body with a customizable field configured to be modified by the messaging system receiving the message, wherein the customizable field is incorporated into the message body by the third party;
receiving a user preference model associated with recipient of the message identified by the recipient ID included in the received message, the user preference model identifying message elements preferred by the recipient of the message based on frequencies of message elements included in messages sent by the recipient of the message or based on frequencies of message elements in messages received by the recipient of the message;
based on the user preference model associated with the recipient of the message, modifying, by the messaging system, the customizable field included in the message received at the messaging system from the third party to produce a customized message; and
transmitting the customized message including the customizable field modified by the messaging system from the messaging system to a client device associated with the recipient ID included in the received message.

2. The method of claim 1, wherein the user preference model is built using steps comprising:
collecting a training dataset, the training dataset including messages exchanged by the recipient of the message;
extracting features from the messages of the training dataset, the features relevant to message elements preferred by the recipient of the message with respect to one or more types of content; and
training the user preference model for the recipient of the message associated with the recipient ID using the features of the training dataset.

3. The method of claim 1, wherein modifying, by the messaging system, the customizable field comprises:
identifying metadata included in the customizable field, the metadata describing a type of content for the customizable field;
using the metadata and the user preference model to determine a content element of the described type; and
filling the customizable field with the determined content element.

4. The method of claim 3, wherein the metadata describes a set of alternative elements and wherein determining the content element of the field comprises selecting the content element from among the set of alternative elements.

5. The method of claim 4, wherein the set of alternative elements comprises a plurality of emoji elements.

6. The method of claim 4, wherein the set of alternative elements comprises a text element and an emoji element.

7. The method of claim 1, further comprising:
determining whether the message includes a flag indicating that the message includes one or more customizable fields;
wherein the user preference model is received responsive to determining that the message includes the flag.

8. A non-transitory computer-readable medium comprising computer program instructions executable by a processor to perform operations comprising:
receiving, at a messaging system, a message from a third party to a user of the messaging system who is a recipient of the message, the received message including a recipient identifier (ID) identifying the recipient of the message and a message body with a customizable field configured to be modified by the messaging system receiving the message, wherein the customizable field is incorporated into the message body by the third party;
receiving a user preference model associated with the recipient of the message identified by the recipient ID identifying the recipient of the message, the user preference model identifying message elements preferred by the recipient of the message based on frequencies of message elements included in messages sent by the recipient of the message or based on frequencies of message elements in messages received by the recipient of the message;
based on the user preference model associated with the recipient of the message, modifying, by the messaging system, the customizable field included in the message received at the messaging system from the third party to produce a customized message; and
transmitting the customized message including the customizable field modified by the messaging system from the messaging system to a client device associated with the recipient ID included in the received message.

9. The computer-readable medium of claim 8, wherein the user preference model is built using steps comprising:
collecting a training dataset, the training dataset including messages exchanged by the user identified by the recipient ID;
extracting features from the messages of the training dataset, the features relevant to message elements preferred by the user with respect to one or more types of content; and
training the user preference model associated with the recipient ID using the features of the training dataset.

10. The computer-readable medium of claim 8, wherein modifying, by the messaging system, the customizable field comprises:

identifying metadata included in the customizable field, the metadata describing a type of content for the customizable field;

using the metadata and the user preference model to determine a content element of the described type; and filling the customizable field with the determined content element.

11. The computer-readable medium of claim 10, wherein the metadata describes a set of alternative elements and wherein determining the content element of the field comprises selecting the content element from among the set of alternative elements.

12. The computer-readable medium of claim 11, wherein the set of alternative elements comprises a plurality of emoji elements.

13. The computer-readable medium of claim 11, wherein the set of alternative elements comprises a text element and an emoji element.

14. The computer-readable medium of claim 8, wherein the operations further comprise:

determining whether the message includes a flag indicating that the message includes one or more customizable fields;

wherein the user preference model is received responsive to determining that the message includes the flag.

15. A system comprising:

a computer processor for executing computer program instructions; and a non-transitory computer-readable storage medium storing computer program instructions executable by the processor to perform operations comprising:

receiving, at a messaging system, a message from a third party to a user of the messaging system who is a recipient of the message, the received message including a recipient identifier (ID) identifying the recipient of the message and a message body with a customizable field configured to be modified by the messaging system receiving the message, wherein the customizable field is incorporated into the message body by the third party;

receiving a user preference model associated with the recipient of the message identified by recipient ID included in the received message, the user preference model identifying message elements preferred by the recipient of the message based on frequencies of message elements in messages sent by the recipient of the message or based on frequencies of message elements in messages received by the recipient of the message;

based on the user preference model associated with the recipient of the message, modifying, by the messaging system, the customizable field included in the message from the third party to produce a customized message; and transmitting the customized message including the customizable field modified by the messaging system from the messaging system to a client device associated with the recipient ID included in the received message.

16. The system of claim 15, wherein the user preference model is built using steps comprising:

collecting a training dataset, the training dataset including messages exchanged by the user identified by the recipient ID;

extracting features from the messages of the training dataset, the features relevant to message elements preferred by the user with respect to one or more types of content; and training the user preference model for associated with the recipient ID using the features of the training dataset.

17. The system of claim 15, wherein modifying, by the messaging system, the customizable field comprises:

identifying metadata included in the customizable field, the metadata describing a type of content for the customizable field;

using the metadata and the user preference model to determine a content element of the described type; and filling the customizable field with the determined content element.

18. The system of claim 17, wherein the metadata describes a set of alternative elements and wherein determining the content element of the field comprises selecting the content element from among the set of alternative elements.

19. The system of claim 18, wherein the set of alternative elements comprises a plurality of emoji elements.

20. The system of claim 18, wherein the set of alternative elements comprises a text element and an emoji element.

* * * * *

UNITED STATES PATENT AND TRADEMARK OFFICE
CERTIFICATE OF CORRECTION

| | |
|---|---|
| PATENT NO. | : 11,496,425 B1 |
| APPLICATION NO. | : 15/976489 |
| DATED | : November 8, 2022 |
| INVENTOR(S) | : Cheng Tian |

It is certified that error appears in the above-identified patent and that said Letters Patent is hereby corrected as shown below:

In the Claims

In Column 10, Claim 9, Line 54, delete "The computer-readable medium" and insert -- The non-transitory computer-readable medium --, therefor.

In Column 10, Claim 10, Line 65, delete "The computer-readable medium" and insert -- The non-transitory computer-readable medium --, therefor.

In Column 11, Claim 11, Line 8, delete "The computer-readable medium" and insert -- The non-transitory computer-readable medium --, therefor.

In Column 11, Claim 12, Line 13, delete "The computer-readable medium" and insert -- The non-transitory computer-readable medium --, therefor.

In Column 11, Claim 13, Line 16, delete "The computer-readable medium" and insert -- The non-transitory computer-readable medium --, therefor.

In Column 11, Claim 14, Line 19, delete "The computer-readable medium" and insert -- The non-transitory computer-readable medium --, therefor.

Signed and Sealed this
Eighteenth Day of April, 2023

Katherine Kelly Vidal
*Director of the United States Patent and Trademark Office*